(12) United States Patent
Ying

(10) Patent No.: US 12,314,089 B2
(45) Date of Patent: May 27, 2025

(54) BENDING UNIT, HINGE, AND FLEXIBLE MODULE BENDING DEVICE

(71) Applicant: HEFEI VISIONOX TECHNOLOGY CO., LTD., Anhui (CN)

(72) Inventor: Rubo Ying, Hefei (CN)

(73) Assignee: HEFEI VISIONOX TECHNOLOGY CO., LTD., Hefei (CN)

( * ) Notice: Subject to any disclaimer, the term of this patent is extended or adjusted under 35 U.S.C. 154(b) by 448 days.

(21) Appl. No.: 17/993,283

(22) Filed: Nov. 23, 2022

(65) Prior Publication Data

US 2023/0081653 A1 Mar. 16, 2023

Related U.S. Application Data

(63) Continuation of application No. PCT/CN2021/121545, filed on Sep. 29, 2021.

(30) Foreign Application Priority Data

Dec. 15, 2020 (CN) .......................... 202023020348.7

(51) Int. Cl.
*G06F 1/16* (2006.01)
*E05D 3/06* (2006.01)
*F16C 11/04* (2006.01)

(52) U.S. Cl.
CPC ............. *G06F 1/1681* (2013.01); *E05D 3/06* (2013.01); *F16C 11/045* (2013.01); *G06F 1/1652* (2013.01)

(58) Field of Classification Search
CPC .... G06F 1/1681; G06F 1/1618; G06F 1/1652; F16C 11/045; H04M 1/0216; H04M 1/022; E05D 3/06; E05D 3/122
See application file for complete search history.

(56) References Cited

U.S. PATENT DOCUMENTS

| | | | |
|---|---|---|---|
| 8,005,521 B2 * | 8/2011 | Cho | ..................... H04M 1/0216 455/575.3 |
| 9,176,535 B2 * | 11/2015 | Bohn | ..................... G06F 1/1681 |

(Continued)

FOREIGN PATENT DOCUMENTS

| CN | 110714977 A | 1/2020 |
|---|---|---|
| CN | 10748553 A | 2/2020 |

(Continued)

OTHER PUBLICATIONS

Extended Search Report issued Apr. 23, 2024, in corresponding European Patent Application No. 21905210.7, 8 pages.

(Continued)

*Primary Examiner* — Jeffrey O'Brien
(74) *Attorney, Agent, or Firm* — Maier & Maier, PLLC

(57) ABSTRACT

Provided are a bending unit, a hinge, and a bending device with flexible module. The bending unit includes two transmission blocks, a connection block, a restricting block, and two rotating arms. The two transmission blocks have a tooth portion respectively. The two transmission blocks match with each other through tooth portions of the two transmission blocks. The two transmission blocks are respectively rotatably connected to the connection block. The restricting block is slidably connected to the connection block. A first end of a rotating arm of the two rotating arms is rotatably connected to one of the two transmission blocks. A second end of the rotating arm is connected to the restricting block. The rotating arm is slidable relative to the restricting block in a first direction and rotatable relative to the restricting block.

20 Claims, 4 Drawing Sheets

(56) References Cited

U.S. PATENT DOCUMENTS

| | | | | |
|---|---|---|---|---|
| 9,603,271 | B2* | 3/2017 | Lee | G06F 1/1652 |
| 9,625,947 | B2* | 4/2017 | Lee | G06F 1/1616 |
| 10,178,765 | B2* | 1/2019 | Fan | G09F 9/301 |
| 10,871,803 | B2* | 12/2020 | Wu | G06F 1/1681 |
| 10,948,947 | B2* | 3/2021 | Yoon | G06F 1/1652 |
| 11,785,730 | B2* | 10/2023 | Hung | H04M 1/022 |
| | | | | 361/807 |
| 12,019,483 | B2* | 6/2024 | Nonaka | G06F 1/1637 |
| 12,066,870 | B2* | 8/2024 | Heiskanen | G06F 1/1616 |
| 12,160,965 | B2* | 12/2024 | Feng | H04M 1/022 |
| 12,259,759 | B2* | 3/2025 | Lin | G06F 1/1681 |
| 2014/0123436 | A1* | 5/2014 | Griffin | G06F 1/1652 |
| | | | | 16/221 |
| 2016/0014914 | A1* | 1/2016 | Stroetmann | H05K 5/30 |
| | | | | 312/223.1 |
| 2018/0121056 | A1* | 5/2018 | Kyoya | G06F 1/1681 |
| 2018/0150107 | A1* | 5/2018 | Lee | H04M 1/0218 |
| 2020/0072532 | A1* | 3/2020 | Möller | E05D 11/06 |
| 2020/0387195 | A1* | 12/2020 | Kim | G09F 9/301 |
| 2023/0240029 | A1* | 7/2023 | Hashimoto | G06F 1/1681 |
| | | | | 361/807 |

FOREIGN PATENT DOCUMENTS

| | | |
|---|---|---|
| CN | 211009550 U | 7/2020 |
| CN | 211370998 U | 8/2020 |
| CN | 111810522 A | 10/2020 |
| CN | 111878505 A | 11/2020 |
| CN | 214063552 U | 8/2021 |
| EP | 3109847 A1 | 12/2016 |
| JP | 2009084863 A | 4/2009 |
| JP | 2019520131 A | 7/2019 |
| WO | 2017195273 A1 | 11/2017 |

OTHER PUBLICATIONS

Notice of Allowance issued on Nov. 8, 2023, in corresponding Japanese Application No. 2023-515228, 5 pages.

International Search Report mailed on Dec. 1, 2021, in corresponding International Application No. PCT/CN2021/121545, 5 pages.

* cited by examiner

BENDING UNIT, HINGE, AND FLEXIBLE MODULE BENDING DEVICE

CROSS-REFERENCE TO RELATED APPLICATIONS

This is a continuation of International Patent Application No. PCT/CN2021/121545, filed on Sep. 29, 2021, which claims priority to Chinese Patent Application No. 202023020348.7 filed on Dec. 15, 2020, the disclosures of which are incorporated herein by reference in their entirety.

TECHNICAL FIELD

The present disclosure relates to the technical field of designing a bending terminal with flexible module, for example, a bending unit, a hinge, and a bending device with flexible module.

BACKGROUND

At present, bending devices such as bendable mobile phones in mass production are mainly bent in a single direction, either inward or outward. A hinge rotating shaft is mainly designed as a rotating shaft bent inward or outward. However, inward and outward bending (i.e., 360° bending), S-shape bending, and rolling bending cannot be implemented at the same device. Accordingly, the design of hinge rotating shafts has become a main bottleneck restricting the development of the bending devices.

SUMMARY

The present disclosure provides a bending unit, a hinge, and a bending device with flexible module so that multiple forms of bending, such as inward and outward bending, S-shape bending, and the like, are implemented at a same device.

A bending unit is provided. The bending unit includes two transmission blocks, a connection block, a restricting block, and two rotating arms. The two transmission blocks have a tooth portion respectively. The two transmission blocks match with each other through tooth portions of the two transmission blocks. The two transmission blocks are respectively rotatably connected to the connection block. The restricting block is slidably connected to the connection block. A first end of a rotating arm of the two rotating arms is rotatably connected to one of the two transmission blocks. A second end of the rotating arm is connected to the restricting block. The rotating arm is slidable relative to the restricting block in a first direction and rotatable relative to the restricting block.

The present disclosure further provides a hinge. The hinge includes a plurality of rotating shafts and a plurality of preceding bending units. A rotating shaft of the plurality of rotating shafts extends in a second direction perpendicular to the first direction, and two ends of the rotating shaft are connected to a corresponding transmission block. Two adjacent rotating shafts of the plurality of rotating shafts are linkage and connected through one of the plurality of bending units.

The present disclosure further provides a bending device with flexible module. The bending device with the flexible module includes the preceding hinge.

DETAILED DESCRIPTION

Figure 1:
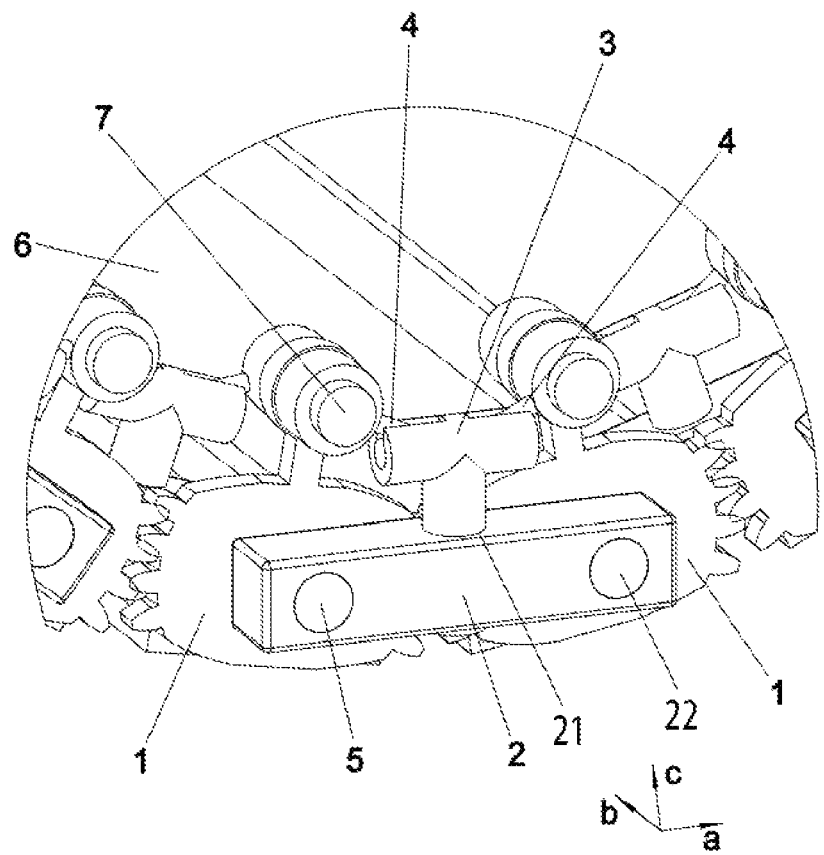
FIG. 1 is a view illustrating a structure of a bending unit according to an embodiment of the present disclosure.
Figure 2:
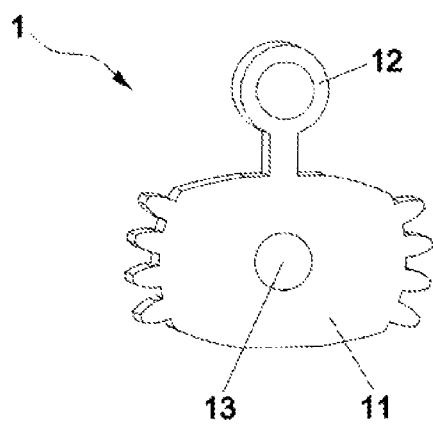
FIG. 2 is a view illustrating a structure of a transmission block of a bending unit according to an embodiment of the present disclosure.
Figure 3:
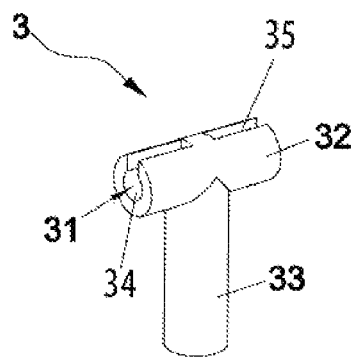
FIG. 3 is a view illustrating a structure of a restricting block of a bending unit according to an embodiment of the present disclosure.
Figure 4:
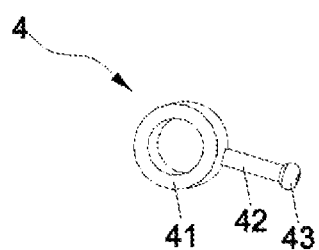
FIG. 4 is a view illustrating a structure of a rotating arm of a bending unit according to an embodiment of the present disclosure.
Figure 5:
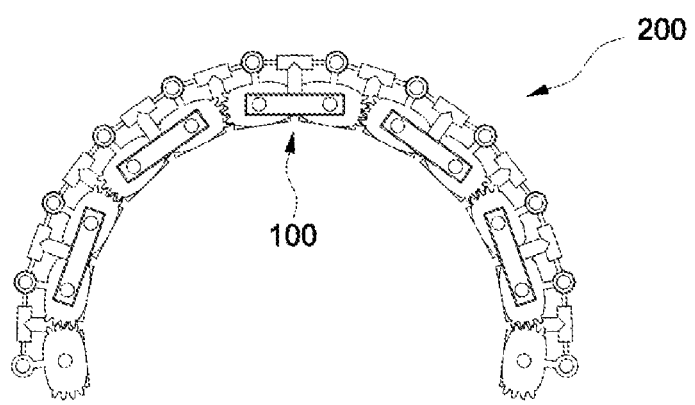
FIG. 5 is a front view of a hinge bent inward according to an embodiment of the present disclosure.
Figure 6:
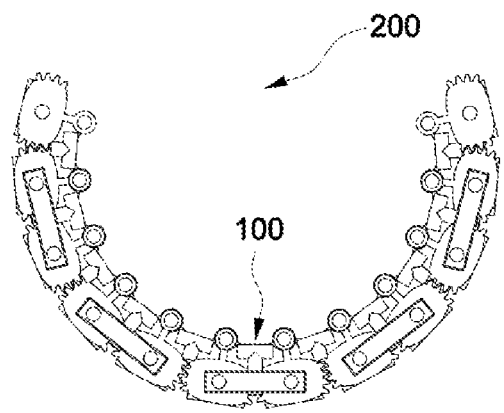
FIG. 6 is a front view of a hinge bent outward according to an embodiment of the present disclosure.
Figure 7:
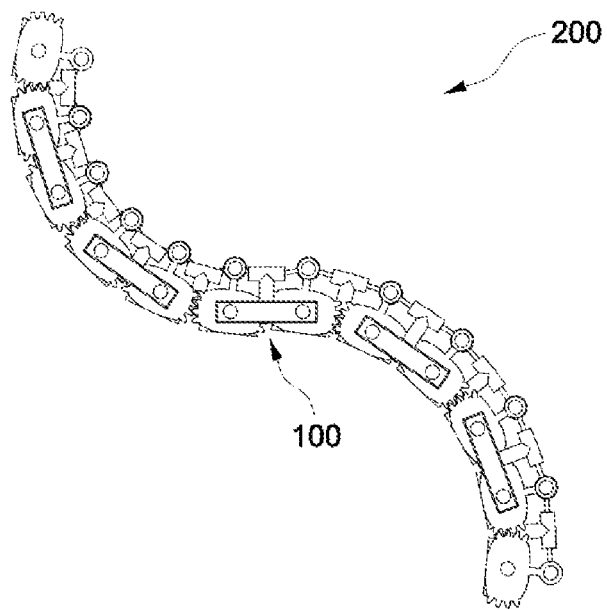
FIG. 7 is a front view of a hinge bent in an S shape according to an embodiment of the present disclosure.
Figure 8:
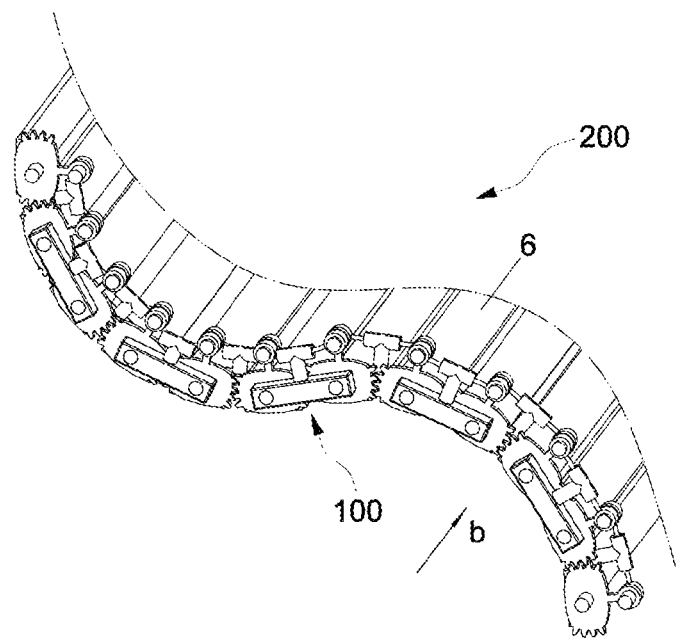
FIG. 8 is a view illustrating a partial structure of a hinge bent in an S shape according to an embodiment of the present disclosure.

To illustrate the technical solutions of embodiments of the present disclosure more clearly, the technical solutions of embodiments of the present disclosure will be described clearly and completely in conjunction with the drawings of embodiments of the present disclosure. Apparently, the embodiments described below may be part of embodiments of the present disclosure. The assemblies of embodiments of the present disclosure described and illustrated in the drawings herein can generally be arranged and designed in various configurations.

A bending unit 100 of an embodiment, which acts as a constituent unit of a hinge 200, can implement an adjustment with multiple degrees of freedom, that is, an adjustment of a rotation angle. As shown in FIGS. 1 to 4, the bending unit 100 includes two transmission blocks 1, a connection block 2, a restricting block 3, and two rotating arms 4. The two transmission blocks 1 have a tooth portion 11 respectively. The two transmission blocks 1 match with each other through the tooth portions 11 of the two transmission blocks 1. The two transmission blocks 1 are respectively rotatably connected to the connection block 2. The restricting block 3 is slidably connected to the connection block 2. One end of a rotating arm of the two rotating arms 4 is rotatably connected to one of the two transmission blocks 1, and the other end of the rotating arm 4 is connected to the restricting block 3. The rotating arm 4 is slidable relative to the restricting block 3 in a first direction a and is rotatable relative to the restricting block 3 in a second direction b perpendicular to the first direction a. The first direction a in this embodiment is defined based on the restricting block 3 in the bending unit 100. The second direction b is a direction perpendicular to the paper if the first direction a is parallel to the paper, and the two rotating arms 4 rotate on a panel parallel to the paper.

The restricting block 3 has a sliding recess 31 extending in the first direction a.

The restricting block 3 is T-shaped and includes a first sliding portion 32 in the first direction a and a second sliding portion 33 in a third direction c, and the sliding recess 31 is disposed on the first sliding portion 32. The two rotating arms 4 are connected to the sliding recess 31 respectively. The second sliding portion 33 is slidably connected to the connection block 2 in the third direction c. For example, the connection block 2 defines a sliding hole 21 extending along the third direction c, and the second sliding portion 33 is slidable in the sliding hole 21. The first direction a, the second direction b, and the third direction c are perpendicular to each other.

A notch of the sliding recess 31 extends to a top of the restricting block 3 in the third direction c so that the two rotating arms 4 can respectively slide in the sliding recess 31 in the first direction a and deflect in the sliding recess 31 along the second direction b. For example, the top of the restricting block 3 is not totally communicated in the first direction a, i.e., the middle of the top of the restricting block 3 is closed and two ends of the top of the restricting block 3 is open, such a structure may guarantee the structural strength of the restricting block 3. For example, the top of the restricting block 3 may also be totally communicated in the first direction a.

The rotating arm 4 includes a rotating head 41, a sliding elbow 42, and an anti-dropping end 43 that are connected in sequence. The rotating head 41 is rotatably connected to the corresponding transmission block 1. The anti-dropping end 43 is located in the sliding recess 31. To get the anti-dropping end 43 always located in the sliding recess 31, a length of the sliding elbow 42 is configured based on that the anti-dropping end 43 is prevented from dropping from the sliding recess 31 when the curvature of the bending unit 100 reaches the maximum.

The sliding recess 31 in the embodiment includes a cylindrical recess 34 and a strip recess 35 communicating with a notch of the cylindrical recess 34. A notch of the strip recess 35 extends to the top of the restricting block 3. The anti-dropping end 43 is spherical and is located in the cylindrical recess 34. The diameter of the anti-dropping end 43 is less than or equal to the diameter of the cylindrical recess 34. The anti-dropping end 43 may also be cubic, cuboid, or in another shape as long as it guarantees that the anti-dropping end 43 does not drop from the cylindrical recess 34. The sliding elbow 42 is cylindrical or may be prismatic, and the diameter of the sliding elbow 42 is not greater than the width of the notch of the strip recess 35 so that the rotating arm 4 is slidable and rotatable in the sliding recess 31. The sliding recess 31 is arranged as a through recess in the first direction a to adapt to different slidable lengths of the two rotating arms 4.

The rotating head 41 is annular. A through hole in the middle of the rotating head 41 is configured to be pin-connected to the corresponding transmission block 1. The sliding elbow 42 is in the shape of a round rod and is connected to a periphery of the rotating head 41. The diameter of the sliding elbow 42 is less than the diameter of sliding recess 31. The rotating head 41, the sliding elbow 42, and the anti-dropping end 43 are integrally formed, which is convenient for processing.

In an embodiment, the tooth portion 11 of each of the two transmission blocks 1 is rectangle-like. Two opposite ends of the tooth portion 11 are respectively provided with several teeth to match with a tooth portion 11 of an adjacent transmission block 1. The tooth portion 11 is connected to a connection arm 12. The connection arm 12 is rotatably connected to a corresponding rotating arm 4 of the two rotating arms 4. A head of the connection arm 12 is annular. The connection arm 12 and the rotating head 41 are connected through a second pin shaft 7 to implement a relative rotation of the connection arm 12 and the rotating head 41. Alternatively, one of the rotating head 41 or the head of the connection arm 12 is annular, and the other one is provided with a pin shaft (instead of the second pin shaft 7) passing through the annular component, which can also implement a pin connection between the connection arm 12 and the rotating head 41.

To implement a connection between the transmission block 1 and the connection block 2, a first connection hole 22 is formed on the connection block 2 in the second direction b. A second connection hole 13 extends through the tooth portion 11 in the second direction b. A first pin shaft 5 is inserted through the first connection hole 22 and the second connection hole 13. Alternatively, one of the connection block 2 or the tooth portion 11 is provided with a connection hole, and the other one is provided with a pin shaft (instead of the first pin shaft 5) passing through the connection hole, which can also implement a pin connection between the connection block 2 and the tooth portion 11.

An embodiment provides a hinge 200. As shown in FIGS. 5 to 8, the hinge 200 includes a plurality of rotating shafts 6 and a plurality of preceding bending units 100. The plurality of rotating shafts 6 extend in the second direction b, and two ends of a rotating shaft 6 of the plurality of rotating shafts 6 are respectively connected to a corresponding transmission block 1 of a bending unit 100. Two adjacent rotating shafts 6 are linkage and connected through one bending unit 100.

An embodiment provides a bending device with flexible module which includes the preceding hinge 200. Exemplarily, the bending device with the flexible module may be a product having a display function, such as a mobile phone, a laptop, or a display.

The bending unit 100 in the above embodiments can implement a stroke adjustment in the third direction c through a sliding match between the restricting block 3 and the connection block 2, can implement a stroke adjustment in the first direction a and an angle adjustment in a plane perpendicular to the second direction b through a match between the restricting block 3 and the two rotating arms 4, can implement an adjustment with multiple degrees of freedom, and can implement an adjustment of a rotation angle of each of the two transmission blocks. The preceding hinge 200 having the plurality of bending units can implement adjustments of the bending radian and the bending diameter of the hinge 200, thereby enabling the hinge 200 to be bent in multiple forms, including to be bent inward (rolled inward), to be bent outward (rolled outward), and to be bent in an S-shape, etc.

For the bending unit 100, the restricting block 3 and the two rotating arms 4 may be designed separately so that bending radians and bending angles of different bending units 100 can be designed differently and radians and angles of upper and lower surfaces can be designed differently. The bending unit 100 can achieve a miniaturized design, thereby improving the force condition per unit area of a curved surface when the hinge 200 is bent. The smaller the bending unit 100 is, the less the force in per unit area of the curved surface is. Moreover, the adjustable bending radian and diameter of the hinge 200 in a multi-unit linkage structure not only implement multiple forms of bending but also reduce the stress applied to the flexible module in a bending process, thereby making the flexible module applicable to different disclosure scenarios and extending the service life of the flexible module.

An embodiment further provides a bending unit 100. The bending unit 100 has the basically same structure as the bending unit 100 in the above embodiments except that a connection manner between the two rotating arms 4 and the restricting block 3 is different.

Figure 9:
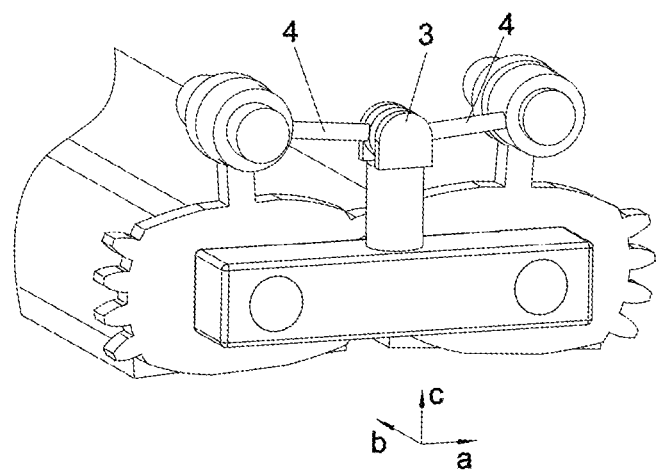
FIG. 9 is a view illustrating a structure of a bending unit according to an embodiment of the present disclosure.

As shown in FIG. 9, only a rotation connection, for example, a pin connection, can be implemented in the second direction b between the restricting block 3 and the two rotating arms. Such a structure reduces the manufacturing difficulty and cost. A U-shape recess is formed on the restricting block 3. The anti-dropping end 43 of each of the two rotating arms 4 is annular. Anti-dropping ends 43 of the two rotating arms 4 are respectively located in the U-shape recess. The anti-dropping ends 43 and the U-shape recess are connected through a third pin shaft inserted in the second direction b, thereby implementing a relative rotation of the two rotating arms 4 and the restricting block 3.

What is claimed is:

1. A bending unit, comprising:
   two transmission blocks, having a tooth portion respectively, and the two transmission blocks match with each other through tooth portions of the two transmission blocks;
   a connection block, wherein the two transmission blocks are respectively rotatably connected to the connection block;
   a restricting block slidably connected to the connection block; and
   two rotating arms, wherein a first end of a rotating arm of the two rotating arms is rotatably connected to one of the two transmission blocks, a second end of the rotating arm is connected to the restricting block, and the rotating arm is slidable relative to the restricting block in a first direction and rotatable relative to the restricting block.

2. The bending unit according to claim 1, wherein the two rotating arms rotate along a second direction perpendicular to the first direction.

3. The bending unit according to claim 1, wherein a transmission block of the two transmission blocks further comprises a connection arm connected to the tooth portion, and the connection arm is rotatably connected to the corresponding rotating arm.

4. The bending unit according to claim 3, further comprising a second connection hole extending through the tooth portion in a second direction perpendicular to the first direction, and the transmission block is pin-connected to the connection block.

5. The bending unit according to claim 4, further comprising a first connection hole formed on the connection block in the second direction; wherein the transmission block and the connection block are connected in a manner in which a first pin shaft is inserted through the first connection hole and the second connection hole.

6. The bending unit according to claim 4, wherein the restricting block has a sliding recess extending in the first direction, and the second end of the rotating arm is connected in the sliding recess.

7. The bending unit according to claim 6, wherein the rotating arm comprises a rotating head, a sliding elbow and an anti-dropping end; wherein the rotating head is rotatably connected to the corresponding transmission block, and the anti-dropping end is located in the sliding recess.

8. The bending unit according to claim 7, wherein a transmission block of the two transmission blocks further comprises a connection arm which is connected to the tooth portion; and
   wherein the rotating head of the rotating arm is pin-connected to the connection arm of the transmission block.

9. The bending unit according to claim 7, wherein the sliding recess comprises a cylindrical recess and a strip recess communicating with a notch of the cylindrical recess; and wherein the anti-dropping end is located in the cylindrical recess, the sliding elbow is column-shaped, and a diameter of the sliding elbow is less than or equal to a width of a notch of the strip recess.

10. The bending unit according to claim 7, wherein the rotating head, the sliding elbow, and the anti-dropping end are integrally formed.

11. The bending unit according to claim 7, wherein the restricting block is T-shaped and comprises a first sliding portion in the first direction and a second sliding portion in a third direction; the sliding recess is disposed on the first sliding portion; the second sliding portion is slidably connected to the connection block in the third direction; and the first direction, the second direction, and the third direction are perpendicular to each other.

12. The bending unit according to claim 11, wherein the connection block defines a sliding hole extending along the third direction, and the second sliding portion is slidable in the sliding hole.

13. The bending unit according to claim 11, wherein a notch of the sliding recess extends to a top of the restricting block in the third direction; and when the restricting block moves relative to the connection block in the third direction, the sliding elbow moves at the notch of the sliding recess.

14. The bending unit according to claim 13, wherein the sliding recess comprises a cylindrical recess and a strip recess communicating with a notch of the cylindrical recess; and
   in the first direction, the middle of the strip recess is closed and two ends of the strip recess are open.

15. The bending unit according to claim 13, wherein the sliding recess comprises a cylindrical recess and a strip recess communicating with a notch of the cylindrical recess, and the strip recess is communicated in the first direction.

16. A hinge, comprising a plurality of rotating shafts and a plurality of bending units according to claim 1, wherein a rotating shaft of the plurality of rotating shafts extends in a second direction perpendicular to the first direction, two ends of the rotating shaft are respectively connected to a corresponding transmission block, and two adjacent rotating shafts of the plurality of rotating shafts are linkage and connected through one of the plurality of bending units.

17. The hinge according to claim 16, wherein a transmission block of the two transmission blocks further comprises a connection arm connected to the tooth portion, and the connection arm is rotatably connected to the corresponding rotating arm; and
   wherein the bending unit further comprises: a second connection hole extending through the tooth portion in the second direction perpendicular to the first direction, a first connection hole formed on the connection block in the second direction; and the transmission block and the connection block are connected in a manner in which a first pin shaft is inserted through the first connection hole and the second connection hole.

18. The hinge according to claim 16, wherein the restricting block has a sliding recess extending in the first direction, and the second end of the rotating arm is connected in the sliding recess.

19. The hinge according to claim 18, wherein the rotating arm comprises a rotating head, a sliding elbow and an anti-dropping end; wherein the rotating head is rotatably connected to the corresponding transmission block, and the anti-dropping end is located in the sliding recess; and
   the restricting block is T-shaped and comprises a first sliding portion in the first direction and a second sliding portion in a third direction; the sliding recess is disposed on the first sliding portion; the second sliding portion is slidably connected to the connection block in the third direction; and the first direction, the second direction, and the third direction are perpendicular to each other.

20. A bending device with flexible module, comprising the hinge according to claim 16.

* * * * *